ns patent

United States Patent [19]
Monroe

[11] Patent Number: 4,886,347
[45] Date of Patent: Dec. 12, 1989

[54] RANGE-FINDING BINOCULAR
[76] Inventor: John N. Monroe, Rte. 3, Box 361-M, Waco, Tex. 76708
[21] Appl. No.: 158,870
[22] Filed: Feb. 22, 1988
[51] Int. Cl.4 .................... G02B 23/10; G02B 27/34; G01C 3/14
[52] U.S. Cl. .................................. 350/551; 350/550; 356/12; 356/16
[58] Field of Search ..................... 356/12, 13, 14, 16, 356/18; 350/550, 551, 552, 553, 554, 565, 566

[56] References Cited
U.S. PATENT DOCUMENTS

| | | | |
|---|---|---|---|
| 1,846,854 | 2/1932 | Eppenstein | 356/12 |
| 1,928,662 | 10/1933 | Eppenstein | 256/13 |
| 1,987,765 | 1/1935 | Wandersleb . | |
| 2,106,631 | 1/1938 | Eppenstein . | |
| 2,106,632 | 1/1938 | Freund | 356/13 |
| 2,397,273 | 3/1946 | Land | 356/12 |
| 2,401,690 | 6/1946 | Luboshez | 356/14 |
| 2,404,301 | 7/1946 | Land . | |
| 2,407,306 | 9/1946 | Land | 356/12 |
| 2,918,855 | 12/1959 | Wilkinson . | |
| 3,180,208 | 4/1965 | Swartz et al. | 356/12 |
| 3,386,330 | 6/1968 | Burris et al. . | |
| 3,392,450 | 7/1968 | Herter et al. . | |
| 3,622,242 | 11/1971 | Land et al. | 356/12 |
| 3,680,946 | 8/1972 | Bellows . | |
| 3,737,232 | 6/1973 | Milburn, Jr. . | |
| 3,784,305 | 1/1974 | Hartmann | 356/16 |
| 3,914,012 | 10/1975 | Boughton . | |
| 4,082,418 | 4/1978 | Keydell et al. . | |
| 4,355,904 | 10/1982 | Balasubramanian | 356/16 |
| 4,787,739 | 11/1988 | Gregory | 350/566 |

FOREIGN PATENT DOCUMENTS 410993 3/1909 France .
180301 1/1936 Switzerland .
5267 of 1902 United Kingdom .
360234 11/1931 United Kingdom .
360238 11/1931 United Kingdom .

Primary Examiner—Bruce Y. Arnold
Assistant Examiner—Martin Lerner
Attorney, Agent, or Firm—James H. Phillips

[57] ABSTRACT

A range-finding binocular is disclosed which has substantially the external appearance and size of a conventional binocular. In each barrel, a system is provided for obtaining a projected image of a range-mark of circular symmetry which is focused in the focal plane of each eye lens at an accurately placed position near the visual axis of the monocular. The distance between the projected image and the visual axis is carefully controlled in order to provide, in stereovision, a sense of distance to the range-mark image which can be "placed alongside" a target of interest by changing the offset distance in a controlled manner. In one embodiment, the image is obtained by a backlighted reticle whose image passes between a transparent glass range-mark translation plate and a transparent glass adjustment plate, through a lens, and to a gold surfaced mirror for directing the projected image into the conventional path of the field of view. The range plate is carried by a holder which is hinged at one end and is pivotable through a small angle by slight fore and aft movement of the free end opposite the hinge as by a fine screw driven by a motor through a gear reduction system. Thus, the position of the range plate determines the offset of the projected image from the optical axis in each monocular, and the cumulative angular position of the motor can be interrogated to obtain and display the apparent range of the image.

8 Claims, 4 Drawing Sheets

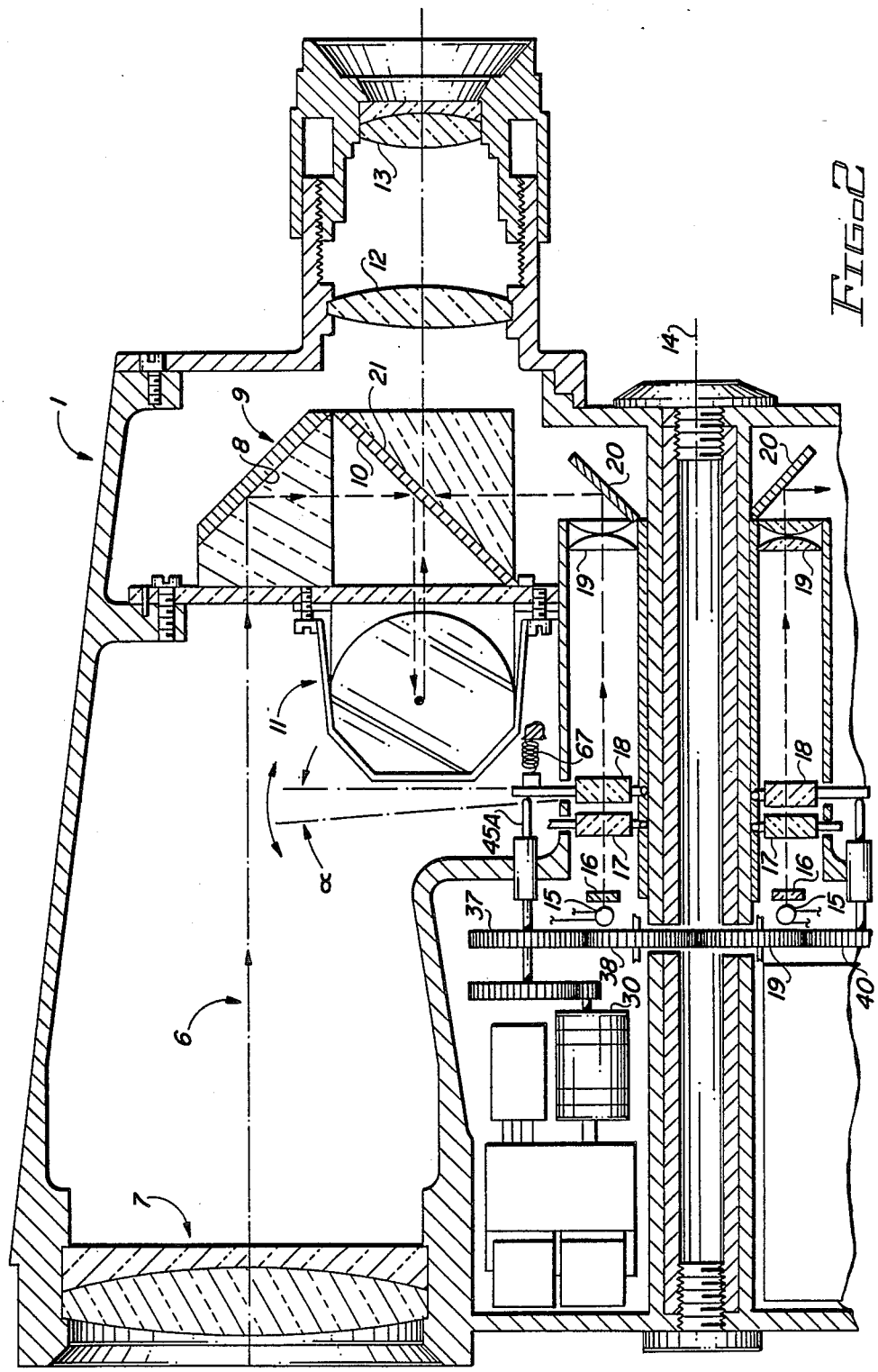

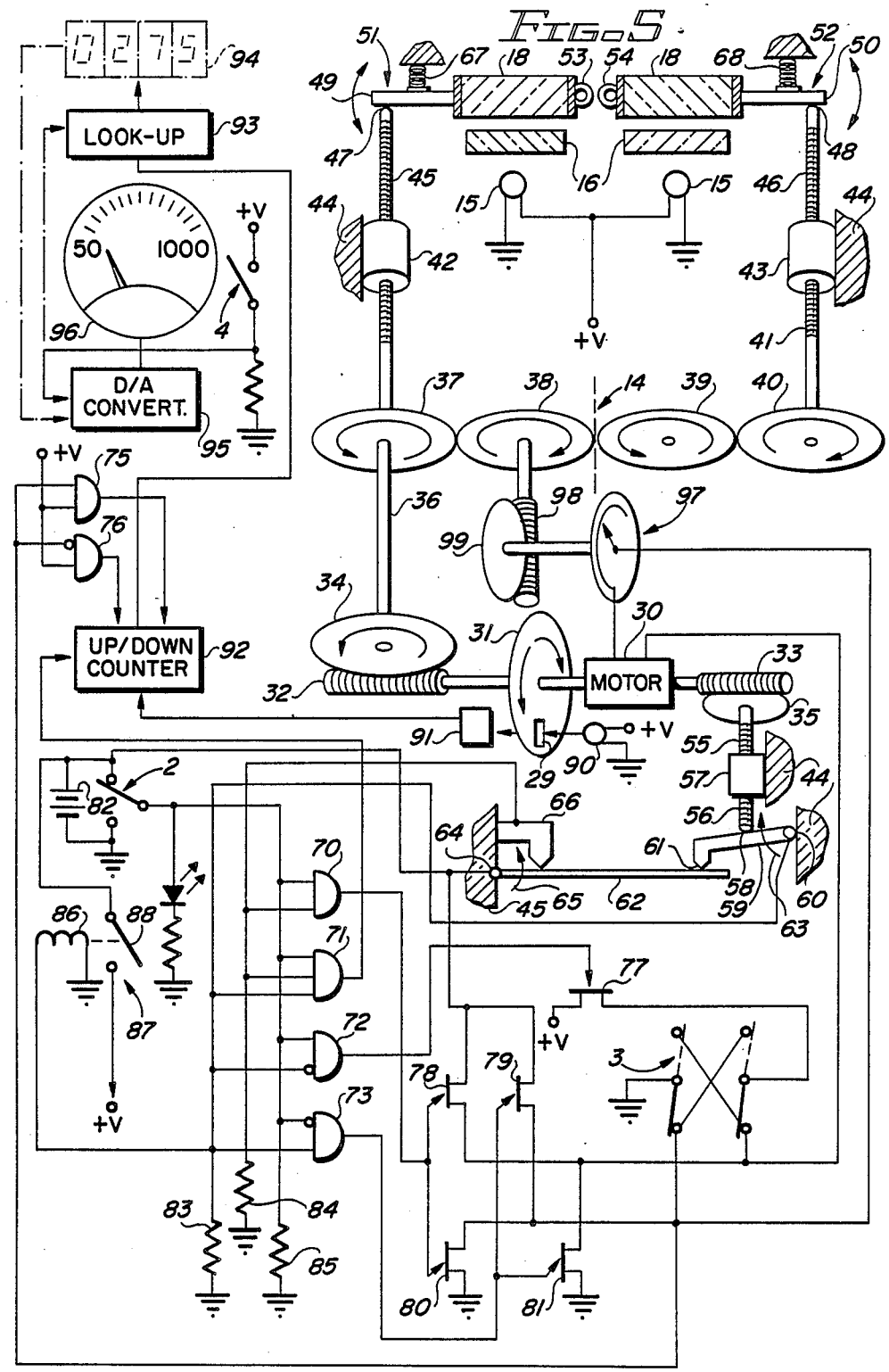

RANGE-FINDING BINOCULAR

FIELD OF THE INVENTION

This invention relates to the optics art and, more particularly, to binoculars of substantially conventional size and configuration which incorporate the ability to determine the range of a target within the field of view.

BACKGROUND OF THE INVENTION

While range finding binoculars are known in the prior art, their usual implementation has been in the form of "military" range finders which, in order to obtain adequate separation of the optical axes, are large and cumbersome mechanisms. Those skilled in the art will appreciate that there has been a long standing need for range finding binoculars which achieve accurate ranging of targets within the field of view into a package which is more or less on the order of conventional binoculars. It is to these ends that my invention is directed.

OBJECTS OF THE INVENTION

It is therefore a broad object of my invention to provide improved range finding binoculars.

It is another object of my invention to provide such range finding binoculars which are relatively conventional in size, appearance and weight.

It is yet another object of my invention to provide such range finding binoculars which are nonetheless very accurate in carrying out the ranging operation.

It is a still yet further object of my invention to provide such range finding binoculars in which the range to a target is obtained by placing a red indicator of circular symmetry alongside the target of interest in the field of view by manipulating a rocker switch and thereafter activating a range readout which appears to the viewer in the field of view.

In a more specific aspect, it is an object of this invention to provide a range finding binocular through which accurate range finding facility is incorporated into a more or less conventional binocular package and in which the inherent capacity of the human eye pair to judge distance is used to advantage by a special purpose electro-mechanical/optical system housed within the binocular body.

SUMMARY OF THE INVENTION

Briefly, these and other objects of my invention are achieved by providing, in each barrel of a binocular, a system for obtaining a projected image of a spot (designated a "range-mark") of circular symmetry which is focused in the focal plane of each eye lens at a very accurately placed position near, but slightly offset from, the visual axis of the monocular effecting the single barrel. The distance between the projected image and the visual axis is very carefully controlled in order to provide, in stereovision, a sense of distance to the projected image which can be "placed alongside" a target of interest by changing the offset distance in a very closely controlled manner. In one particularly preferred embodiment, the projected image is obtained, in each barrel, by a backlighted reticle whose image serially passes between a transparent glass range-mark translation plate and a transparent glass adjustment plate, through a lens, and to a gold surfaced mirror for directing the projected image into the conventional path of the field of view. The range plate is carried by a holder which is hinged at one end and is pivotable through a slight angle by slight fore and aft movement of the free end opposite the hinge as by a fine gun screw driven by a reversible d-c motor through a gear reduction system. Thus, the position of the range plate determines the offset of the projected image from the optical axis in each monocular, and the cumulative angular position of the motor (as it may have progressed through a number of turns in either or both directions) can be interrogated to obtain a relationship by which the apparent range of the projected image can be obtained and displayed.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

FIG. 2 is a partially broken away cross sectional view illustrating, in detail, the optical subsystem incorporated to obtain the range finding capabilities of the subject binocular and also illustrating that the electro/mechanical subsystem for driving a range-mark translation plate component of the optical subsystem can be readily accommodated;

DETAILED DESCRIPTION OF THE INVENTION

Figure 1:
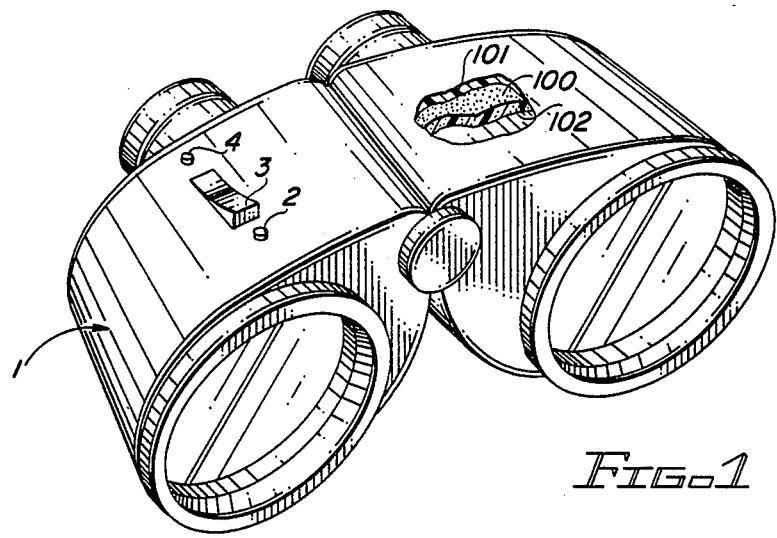
FIG. 1 is a generalized view of a binocular incorporating the present invention and illustrating the fact that the mechanism can be incorporated into a more or less conventional binocular body.

Accuracy in stereovision is limited by accuracy in fusion rather than in the capability of visually separating one point from another. Accordingly, although the limit of resolution of the unaided eye (i.e., the ability to separate points visually) is no better than about $3 \times 10^{-4}$ radians or about one minute of arc, the capability of the human eye is, however, much greater for cases of stereovision. The case of stereovision alignment can be compared to that of normal visual acuity or diffraction limitation by the consideration of the view of two "blur spots" (in this case, Airy discs). If the centers of the blur spots are brought closer and closer together until the blur spots are well into each other, one cannot distinguish as to whether there is one or two blur spots. If, however, the blur spots are superimposed on one another, then, by observation of shape or alignment, one can determine with much greater accuracy the degree to which the center of one blur spot is directly covered by the center of another. Accordingly, stereovision affords much greater angular accuracy than the conventionally considered diffraction limitation by a factor of more than five. Therefore, the accuracy and range resolution of stereovision is generally accepted as the equivalent of twelve minutes (at the very worst) or less in spatial resolution.

"Vernier Acuity is the ability of the eye to align two objects, such as two straight lines, a line and a cross hair, a line between two parallel lines, etc. In making settings of this type, the eye is extremely capable. In instrument design, it can be safely assumed that the average person can repeat vernier settings to better than five seconds of arc and that he will be accurate to about ten seconds of arc. Exceptional individuals may do as well as one or two seconds. Thus, the vernier acuity is five or ten times the visual acuity." (*Modern Optical Engineering* by Warren J. Smith, McGraw Hill, 1966, p. 107)

The performance of military stereoscopic range-finders, however, has historically been based on an assumption of probable error of twelve seconds of arc. This large estimation for error is based in part on atmospheric limitations combined with the design characteristics of the typical military stereoscopic range-finder itself. A relatively long-base line between the objectives (about a yard) introduces severe beam steering problems as each objective views the target through widely separated "tunnels" of atmosphere over most of the long distance involved in military applications. Also the long-distance applications (thousand of yards) introduces a seriously limiting atmospheric haze factor. Accordingly, the range resolution of the military range-finder is determined by the relation R′=0.006R/BM where R′ is the range resolution expressed in percent of range, R the Range, B the base length, and M the magnification. Experimental observations support the data furnished by Smith which, due to the shorter base length of the binocular combined with ranges of hundreds of yards as opposed to thousands, assume an error of no more than six seconds of arc. Based on this experimentally confirmed value, the range resolution of stereovision, again expressed in terms of percent of range is:

$$R' = 0.003R/BM$$

Referring to FIG. 1, the subject stereoscopic range-finding binocular 1 allows the retention of both the appearance and function of conventional binoculars, but is augmented with range-finding capability by the pressing of buttons. As a result, the subject binocular can be used to determine the accurate range to a target or point of interest without the need to know the size of the target. Accordingly, when the range of a target has been determined, the size of the target can be closely estimate.

There are three buttons on top of the binocular. When the first button 2 is depressed, a distinct and transparent bright red spot (hereinafter called a "range-mark") appears in both focal planes and, therefore, in the field-of-view of the binocular. Since the range-mark appears in similar locations within both focal planes, it appears as a transparent red object floating in space. When another button (a rocker switch 3) is manipulated, the range-mark which floats in space appears to change in range, anywhere from about fifty yards to about a thousand yards. If the binocular is directed toward an object of interest (a deer for example), and if the rocker switch 3 is manipulated until the range-mark appears to be at the same range as the target of interest, then a third button 4 is depressed. This third button brings a number or dial indication across or adjacent the field-of-view to present the viewer with the range to the range-mark and hence to the target of interest.

The range-mark (when used, for example, in the woods) will appear to penetrate the woods, even trunks of trees, in order to arrive at the appropriate range, still clear and distinct. For this reason, if a deer is seen through a small clearing within forest or brush, the range mark can be apparently placed along side the deer as the forest or brush will appear transparent at that location. Similarly, if a potential purchaser tries the binocular in the store, he will see the range-mark move to various ranges, through and beyond the walls of the building.

After the range has been determined, when the first button 2 is depressed again, the floating red spot or range-mark and the range indication disappear. As a result, the field-of-view is now clear, and the binocular becomes functionally indistinguishable from one of conventional design.

A contemplated manually operated range-finder binocular is not significantly different from the motorized version except in two respects; viz.: (1) The range-mark must be moved in apparent range by the manual operation of a knurled knob, and (2) no batteries are required Even in this case, however, the red range-mark is brighter than the red component of the spectrum of any ambient source except the sun itself.

The basic construction of a presently preferred embodiment of a stereoscopic range-finder binocular 1 according to the present invention is shown in FIG. 2. Whenever numbers are called out, as for a specific design, assumed design parameters for the example are as follows:

| | |
|---|---|
| Power: | 7X |
| Inter Objective Distance: | 127 mm |
| Objective Focal Length: | 193 mm |
| Minimum Range Observation: | 50 yards |

Those skilled in the art will appreciate that FIG. 2 illustrates one barrel of a conventional binocular which has been adapted to incorporate the range finding features of the present invention. Thus, the conventional components in the barrel will be discussed first. The optical axis through the several components is indicated by the dashed line 6 and extends from the center of the external field of view to the center of the exit to the viewing eye.

Thus, the optical path 6 extends through an objective lens 7 rearwardly until it is reflected from first face 8 of rear prism 9 at right angles toward the pivot axis 14 between the barrels to the second face 10 of the rear prism 9 which directs it forwardly to a lower face (out of view in FIG. 2) of a front prism 11. The optical path then is directed upwardly toward the viewer of FIG. 2 to encounter an upper face of front prism 11 which redirects the image rearwardly toward field lens 12. The path then extends through eye lens 13 to the viewer's eye. Again, those skilled in the art will recognize that the immediately foregoing description is simply that of a conventional optical path through one barrel of a good quality binocular.

However, as previously mentioned, each barrel also has provision for establisiing a projected image of a range-mark of circular symmetry (such as a "moon"; variant configurations for the projected image are discussed below) which is focused in the focal plane of each eye lens at a very accurately placed position near the visual axis of the monocular.

The visual axes of the binocular 1 are taken as lines in the space which are parallel to the hinge-line 14 of the binocular such that, when the binocular barrels are rotated about the hinge-line, the range-marks of circular symmetry in the focal planes do not move within those focal planes relative to the scene viewed at infinity (if the range-marks are centered on the visual axes).

The images of the range-marks are projected from back-lighted (as by lamps 15 which may be light emitting diodes, low power incandescent lamps, etc.) through reticles 16, adjustment plates 17, range-mark translation plates 18 and reimaging lenses 19 onto gold-surfaced mirrors 20 and then onto the focal plane of the eye lens 13 by a semi-transparent, gold-surfaced (or dichroic) beam splitter 21.

Although the position of the gold-surfaced mirror 20 for each barrel is adjustable during initial factory calibration, adjustment screws do not allow adequately fine adjustment of that mirror for moving the range-mark (in the focal plane) an amount as little as or less than one micron, and achieving that degree of precision and fineness of movement, as will be discussed further below, is essential. A screw adjustment to the gold-surfaced mirror 20 would allow no less than a 0.057 degree angle in adjustment by the turn of a fine gun screw (pitch of 1/56 inch or 0.45 mm) as little as ten degrees assuming a reasonable example in which the mirror is hinged at 0.5 inch (1.27 cm) from the screw. If the mirror is two inches (5.05 cm) from the focal plane, then the range-mark will move approximately 0.1 mm (0.004 inches) with this adjustment. One can reasonably expect such a screw adjustment to be no finer than ⅓ of this amount or about 0.033 mm (0.0013 inch) in each focal plane, and this is not sufficiently fine for the intended purpose.

Therefore, while the angle of the gold-surfaced mirror 20 can be employed as a "coarse" factory calibration, a method of finer (factory calibration) adjustment and finer control of the range-mark in field use is required which will result in a closely controlled range-mark motion of as little as 0.4 micron (0.0004 mm) in the focal plane (in each barrel), but, at the same time, provide for a correction of as much as the required 0.033 mm in each focal plane. This finer-adjustment capability is provided by the adjustment plate 17 (factory calibration) and the range-mark translation plate 18 (field use) in each barrel as shown in FIG. 2.

If these transparent plates of glass (n 1.52) having a thickness of ⅛ inch, (3.175 mm) are moved in angle as much as 1.8 degrees, then the range-mark can be translated the required 0.033 mm in each focal plane. At the same time, the tilting of either of these plates, by as little as 1.25 minutes of arc, will translate each range-mark 0.385 microns which represents 0.048 minutes or 2.88 seconds to the viewing eye. The total effect of this latter dual translation of the range-mark amounts to twice this angular value or 5.76 seconds, the approximate limit of the human ocular system in stereovision.

In order to move each adjustment plate 17 or range-mark translation plate 18 by as little as 1.25 minutes of arc, a gun screw with a pitch of 1/56 inch (0.454 mm) can be used. (In order to simplify the drawing, the factory adjustment screws for the adjustment plate 17 are not shown in FIG. 2.) If this screw is turned 7.32 degrees, each plate end is moved a linear distance of 0.000363 inches (0.00922 mm); this motion rotates the plate 1.25 minutes of arc as required, if a lever arm of one inch (25.4 mm) is provided.

A range-mark displacement in each focal plane of the exemplary binocular for fifty yards range through infinity is 0.267 mm. This is achieved by rotation of either of the plates a total of about fourteen degrees tilted toward the user and distributed (for reasons which will be discussed further below) nasally for $+10.5$ degrees and temporally for $-3.5$ degrees. When the $-3.5$ degree setting is chosen as the position for adjustment to infinite range, then the $+10.5$ degree setting represents a range of about fifty yards. Thus, as a practical matter, the adjustment plate 17 is set at the factory to permit the range-mark translation plate 18 this range of operation.

The exact positions or order in position of the adjustment plate 17 and the range-mark translation plate 18 is unimportant as long as they both lie between the lens assembly 19 and the back-lighted reticle 16 as shown in FIG. 2. The closer they are to the reticle 16, however, the better. This is because the closer to the reticle 16, the poorer the quality of the lens glass plates that can be used as the adjustment plates 18 and range-mark translation plates 19. Thus, ordinary plate glass might be used as the adjustment plates 17 and the range-mark translation plates 18. Also, since gold (or dichroic) reflective surfaces are used in the mirrors and the beam splitters, the resulting color of the range-marks is red, making it unnecessry to provide color-corrected reimaging lenses such that molded plastic lenses may well suffice here.

Figure 4:
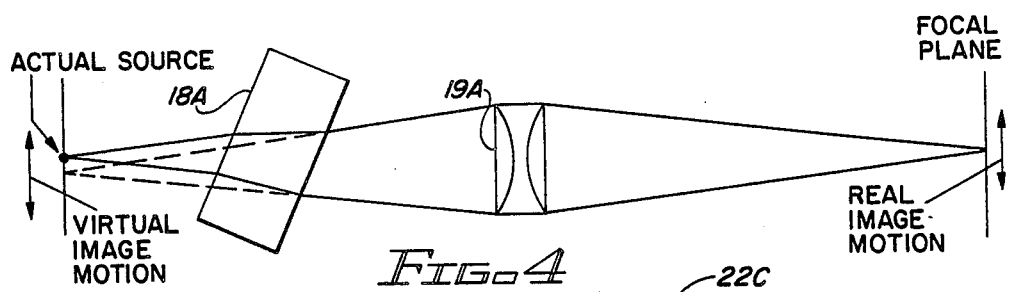
FIG. 4 is a somewhat exaggerated view illustrating the effect of a tilted plate situated in an optical path between an image and a virtual image and is discussed in the context of minimizing potential aberrations in the range finding binocular; positions of the range-mark translation plates in such a manner that a given position can be related to an apparent range of the projected image.

No significant aberrations are introduced by the optical components added. Referring briefly to FIG. 4, it might at first be considered that a plate of glass (n $=1.52$) 18A tilted (shown in an exaggerated manner) and even at a few degrees, and between the objective and the focal-plane, might contribute significant astigmatism. Calculations show, however, that the rays representing the center of the field-of-view suffer total aberrations which are confined to a spot in the focal plane of less than $10^{-4}$ inch, which represents ⅓ of the diffraction limitation of the eye for the chosen eye lens, and also considerably less than the diffraction limitation of the binocular itself. In this case, the image is not measurably degraded. Rather, it might be considered that the tilting of the plate 18A rearranges the energy distribution within the range-marks and does not affect one's ability to line up the range marks as previously discussed. For a maximum plate rotation of 10.5 degrees, the aberrations are still limited to an amount less than the diffraction limit of the eye. Also, in the present use, this 10.5 degree rotation represents the range observation of no more than fifty yards where small differences in range are represented by relatively large angular differences in the observation by the two eyes. Aberrations resulting from plate tilts of less than 3.5 degrees (for ranges exceeding 100 yards) are negligible. It may now be understood, therefore, why the translation range of the range-mark translation plate 18 is selected to fall between $+10.5$ degrees and $-3.5$ degrees.

When used in parallel light, a plane parallel plate is free of aberrations (since the rays enter and leave at the same angles). However, if, as in the present application, the plate is inserted in a conversion or diversion beam, it does introduce aberrations. When the plate 18A is tilted, the image formed by the meridional rays is shifted backward while the image formed by the sagittal rays (in a plane perpendicular to the page in the Figures) is not so that astigmatism is introduced. (The amount of aberration introduced by a tilted plane parallel plate can be computed by the formulae below obtained from *Modern Optical Engineering* by Warren J. Smith, McGraw Hill, 1966, pp. 83–84.)

Chromatic Aberration $= t(N-1)/N^2 V$

Spherical Aberration $= tu^2(N^2-1)/2N^3$

Astigmatism $= tu_p^2(N^2-1)/N^3$

Sagittal Coma $= tu^2 u_p(N^2-1)/2N^3$

Lateral chromatic $= tu_p(N-1)/NV$ where:
U and u are the slope angle of the ray to the axis,
$U_p$ and $u_p$ are the tilt of the plate,
t is the thickness of the plate,
N is the index of the plate, and
V is the Abbe V number $(N_D-1)/(N_F-N_C)$ For the immediate application, it is astigmatism that is of concern, and it has been demonstrated that if the tilts of the adjustment plate 17 and the range-mark translation plate 18 are constrained within the previously discussed limits, the aberrations introduced by the plate tilt are insignificant in view of the intended purpose.

Referring now to FIGS. 3A, 3B, 3C and 3D, the focal plane compensation for the objective adjustment will be discussed. As the barrels of the binocular are rotated for the adjustment of interocular distance by a given user, two effects are automatically compensated if, and only if, the range-marks are automatically moved by tilting the adjustment plates 17 and range-mark translation plates 18 always in directions in the focal planes which are parallel to a perpendicular line connecting each objective lens axis to the hinge-line 14. (See FIG. 2) If the positions of the circular range-marks are adjusted for an infinite range, then as the binocular barrels are moved about the hinge line, no change in range is observed as the range-marks always remain in the position of the visual axis.

When the range-marks are displaced laterally so as to appear at a closer range, then two effects result when the binocular barrels are rotated about the hinge line. First, the objectives change in distance of separation. Accordingly, the base-line length is altered. Also the lateral displacement distance of the range-marks is altered in the focal plane (focal plane compensation) in proportion to the value of d cos alpha where alpha is the angle of rotation of each barrel. This is the same value by which the base line is altered in objective readjustment. Again, this is only true, however, when the focal plane range-marks are translated for range adjustment in directions parallel to lines perpendicular to and connecting the visual axes with the hinge line.

Therefore, when the base-line is reduced by an amount proportional to the reduction of lateral horizontal displacement of the focal plane range-marks, the apparent range of the range-mark indication remains equal to the apparent range of any target in the field-of-view. Also, the vertical motion of each range-mark is the same (d sin alpha) as the binocular barrels are rotated; therefore, fusion of the range-mark image is not disrupted by interocular adjustment.

These compensation effects are subtle and will therefore be discussed in further detail. In the following discussion, it will be understood that FIGS. 3B, 3C and 3D are very much enlarged from the central region of the fields of view illustrated in FIG. 3A. First, consider the hinge line 14A (FIG. 3A) of a binocular fixed in space while observing a target of the "real-world". This target object could be anything one might encounter, and for this illustration, a square object 27 will be assumed with reference to FIGS. 3B and 3C. Thus, the square target 27 is positioned relative to the binocular such that the image of the target occupies locations in the focal planes, the centers of which represent the visual axes of both monoculars. If the target is at an infinite distance, then the folding of the binocular does not change the locations nor the orientations of the images of the target in the focal planes.

When, however, the target is moved to a finite range, changes in the image position result as shown in FIG. 3C. For a binocular so configured that the hinge-line and the optic axes of both monoculars fall in the same plane, then the two images of the target are translated horizontally by the distance x where:

$x = F/R \, d$ and F is the focal length of the objective, R is the range to the target, and d is the distance between the hinge-line and the optic axis of either monocular.

It must be remembered, however, that the inversion by prisms causes changes in image positions to be exactly opposite as would be otherwise expected. Accordingly, a reduction in the range to the target results in movement of target images in focal planes, in nasal rather than temporal directions.

Figure 3A:
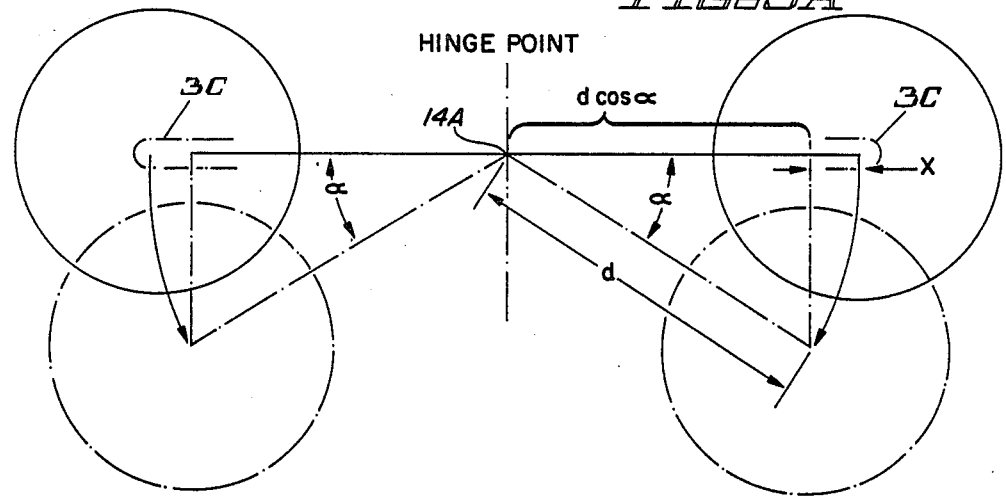
FIGS. 3A, 3B, 3C and 3D illustrate various relationships which change as a binocular is adjusted to different interocular distances and particularly showing certain subtle compensating effects achieved by the subject range finding binocular which inherently eliminate potential sources of error.
Figure 3C:
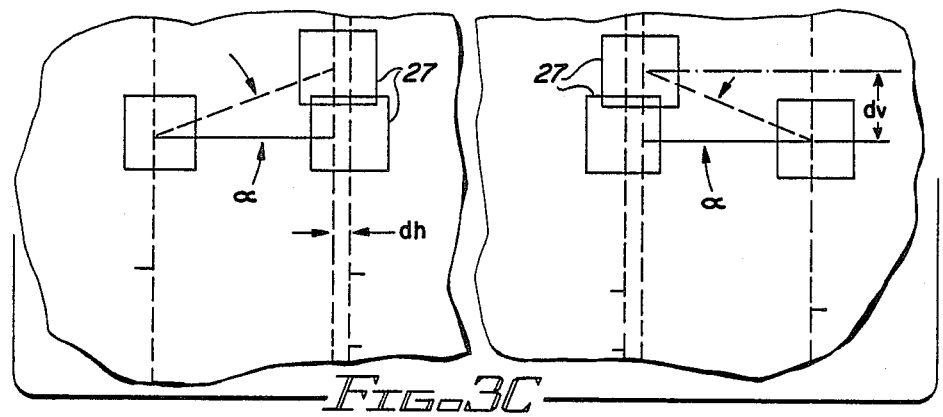
Figure 3B:
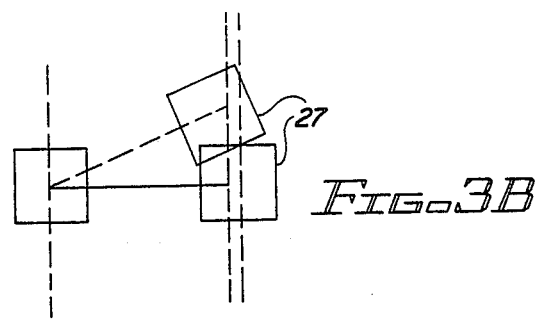
Figure 3D:
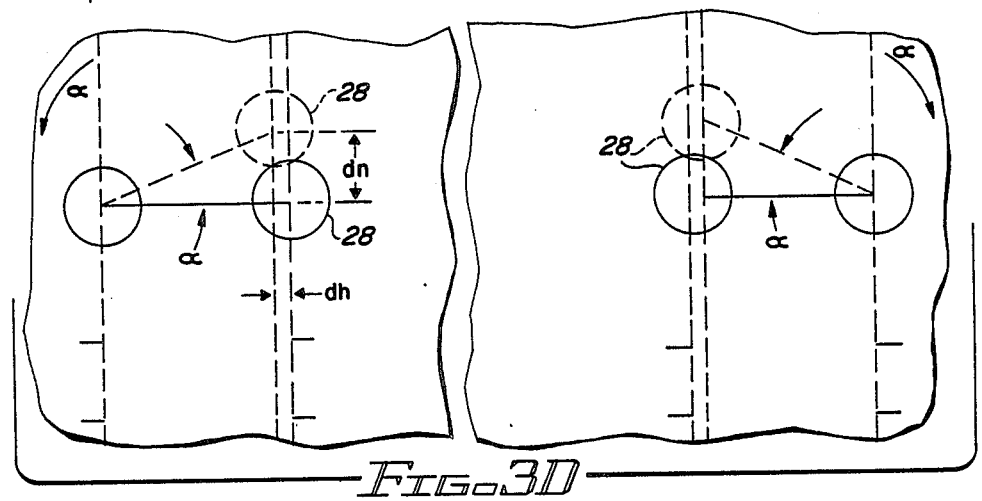

As the binocular is folded through the total angle alpha as shown in FIG. 3A, the image of the target 27 in the focal plane is translated through the angle in each focal plane as shown in FIG. 3C. These images are merely translated as stated and are not rotated or misoriented in the manner which might be expected as shown in FIG. 3B. The direction of translation of these images are, of course, exactly opposed to the direction of translation of the objective centers shown in FIG. 3A.

The exact amount of horizontal movement of the images in each focal plane is given by the relation:

$d_h = d_o - d_o \cos \, alpha$ where $d_h$ is the horizontal component of motion.

The exact amount of vertical movement $d_v$ of the image in each focal plane is given by the relation:

$d_v, d_o \sin \, alpha$

Now, consider the corresponding motion of the range-marks in the focal planes as the binocular is folded for adjustment in interocular distance. As shown in FIG. 3D, this range-mark 28, unlike the target, is of circular symmetry. That is, it could be a perfectly round "moon" or perhaps a simple circle. (As will be discussed below, the preferred range-mark configuration, however, is more like a conventional "target"; i.e., concentric circles.) For the adjustment indicating infinite range, both range-marks would occupy areas centered at the points in the focal planes representing the visual axis of the binocular, the direction parallel to the hinge line. In the case of the range-marks, they never move in the focal plane in response to the translatory motion of the monoculars relative to one another as do the images of the real-world target, regardless of range setting.

If the range-marks are adjusted to appear as though they are floating in space at some finite range, then they must occupy the identical positions relative to the visual axes as would be previously occupied by a real-world target, on the visual axes, at the same range. However, the range-marks should be of circular symmetry and should always be adjusted for various ranges internal to the binocular, in directions within the focal plane which are parallel to perpendiculars connecting the hinge-line to each objective axis. Therefore, for any adjustment in apparent range of the range-mark, the range-mark of each focal plane is moved some distance $d_o$ such that both range-marks will occupy corresponding positions in the focal planes as would have been occupied by the real-world target under conditions stated earlier. Compare FIG. 3D to FIG. 3C. Again, it should be clear that translatory motion of the monoculars does in no way affect the positions of the range-marks; rotary motion, however, does so. Therefore, as the binocular is folded for the adjustment of interocular distance, both barrels are rotated. If they are both rotated through the angle alpha, then the exact amount of horizontal movement of the image in each focal plane is given by the relation:

$$d_h = d_o \cos alpha$$

The vertical movement of the range-mark in each focal plane is given by the relation:

$$d_v = d_o \sin alpha$$

It is to be noted that the spatial relations in the focal planes represented by the images of the real-world target (in FIG. 3C) and those of the range-mark (in FIG. 3D) are identical although the displacement (from folding of the binocular) of the real-world target results from translation while the same displacement of the range-marks results from rotation. Since the images of the range-marks are rotated about the visual axes rather than translated as in the case of the real-world images, circular symmetry is preferred for the shape of the range-marks; i.e., if they were square, the FIG. 3B effect would be present.

It may be noted in this context that the exactness and consistency of the axis of rotation of the pin-sleeve and (particularly) the long-taper hinges used in fine binoculars has been established to be so close as to be a negligible source of error. Accordingly, it has been determined that deviation from parallelism of the optic axes to the hinge line remains true to the point that such deviation cannot be easily measured either mechanically or optically.

Referring again to FIG. 2, the relations between the rotation of the screw 45A which tilts the range-mark translation plate 18, and the translation of the range-mark in the focal plane, and the value of the numbers indicating the range will be examined. Each range-mark is translated in accordance with the relation $x = F/R \, d$ where F is the focal length of the objective, R is the apparent range to the range-mark and d is the distance between the optic axis and the binocular hinge-line (measured along a mutual perpendicular). X is, of course, the displacement of the range-mark in the focal plane. The value of F/R could be expressed as radians, the sine or the tangent because all these values can be considered the same since the angle is extremely small. Thus, the above value actually defines the point at which the real-world target would come to focus if that target were on the hinge-line axis.

The discussion immediately following does not relate to the direct method (which will be discussed further below) by which the binocular mechanism operates to determine the range, but it is useful for a full understanding of the relevant principles.

Still referring to FIG. 2, after initial angular adjustment of the gold-surface mirror 20 (coarse) and the adjustment plate 17 (fine), the range-mark is centered at the point in the focal plane representing the visual axis (the direction of the hinge-line). This may be considered a permanent "factory" adjustment which would only be altered during subsequent internal repair and recalibration if at all.

Thereafter, when the range-mark translation plate 18 is tilted, the range-mark is translated in accordance with the relation:

$$d_o = (D \cos i)(\tan i = \tan r)$$

where i is the angle of tilt, D the thickness of the plate and r the angle of refraction. As a typical example, the value of n (the index of refraction) is taken as 1.52 and the thickness of the glass is $\frac{1}{8}$ inch or 3.175 mm.

Since the relation of do to i is not linear, equal values of angular tilt of the range-mark translation plate do not result in equal values of translation of the image of the range-mark in the focal plane. For example, for a range as short as fifty yards, it is necessary that the range-mark translation plate be tilted as much 10.59 degrees. This extreme tilt results in an error of 2.5 microns, considerably more than the stereoscopic resolution limit of the human ocular system.

If, however, the range translation plate is moved in equal increments in terms of the tangent of the angle of the tilt (tan i and not in equal increments in angle), then the displacement of the range-mark image changes in equal (or very close to equal) increments within the total motion of 14.12 degrees ($-3.53$ to $+10.59$). In this case, the error derived from range-mark translation as related to the tangent of the angle of rotation of the translation plate, is always considerably less (within the range of interest) than the limit of stereoscopic resolution of the human ocular system. Even at the extreme plate position of 10.59 degrees, the derived error is only 0.053 microns. The value of $d_o$ as determined by the term F/R d, representing the range-mark translation required for perfect coincidence with an actual target of fifty yards range, is:

F/R d = 201.04166 microns

The corresponding value achieved by rotation of the range translation plate in increments of tangent of the angle is:

$$d_o = (d \cos i_1)(\tan i_1 - \tan r_1)$$
$$= 200.98854 \text{ microns}$$

where $i_1$ is i (i/tani) and:

$$r_1 = \sin^{-1}(i_1/n)$$
$$= \sin^{-1}(i(i/\tan i))/1.52$$

and the resulting error is therefore 201.04166−200.98854=0.05312 microns.

This error is less than the limit of stereoscopic resolution of the human ocular system by a factor of about one order of magnitude. The total motion of each range-mark translation plate 18 is between values of −0.0616161 and 0.1848304 for the tangent of the angle of rotation or tilt. (The positive angle is the tilt nasally toward the user; the negative angle is the tilt temporally toward the user.) The linear relation between screw position and range-mark image translation makes calibration rather simple for the range determination method explained below.

A presently preferred embodiment of the electromechanical system of the subject range-finding binocular is illustrated very much simplified in FIG. 2. Reference may therefore be taken to the much more complete electromechanical schematic diagram set forth in FIG. 5. A reversible d-c motor 30 directly drives a counter wheel 31 and worms 32, 33 which effect a gear reduction to worm driven gears 34, 35. Gear 34 is connected to a shaft 36 which also carries spur gear 37 which engages (teeth not shown) spur gear 38. Spur gear 38, in turn, engages spur gear 39 which itself engages spur gear 40. Thus, it will be understood that the rotation of the shaft 36 is communicated through spur gears 37, 38, 39 to spur gear 40 which rotates in the opposite direction, but at the same rate. Thus, shaft 41, fixed to spur gear 40, rotates in synchronism with and in the opposite direction from the rotation of the shaft 36.

A pair of finely internally threaded nuts 42, 43 are respectively attached to the body 44 of the binocular such that they may be considered fixed in position. The forwardmost sections 45, 46 of the shafts 36, 41 which pass through the nuts 42, 43 are externally threaded (e.g., at a pitch of 1/56 inch or 0.45 mm) such that circumferential movement of the spur gears 37, 40 causes fine fore and aft movement of the threaded portions 45, 46 of the shafts 36, 41 with respect to the body 44 of the binoculars. It will be understood that the width of the gears 34, 37, 38, 39, 40 is sufficient to accommodate the full range of fore and aft movement without becoming unmeshed. Alternatively, the shafts 36, 41 may be slidably keyed to the spur gears 37, 40 such that they rotate with the spur gears and move fore and aft independently of the spur gears.

Ends 47, 48 of the shafts 36, 41 bear against the outboard ends 49, 50 of range-mark translation plate holders 51, 52 which carry the range-mark translation plates 18. The range-mark translation plate holders 51, 52 are pivotally fixed (as at 53, 54) at their inboard ends such that fore and aft translation of the shafts 36, 41 effect coordinated tilting movement of the range translation plates 18 tangentially applied at 49, 50. As represented by compression springs 67, 68 the range-mark translation plate holders 51, 52 are spring biased against the fore and aft movement of the shaft ends 47, 48.

The gear 35 driven by worm 33 is directly coupled to a shaft 55 having a threaded portion 56 which passes through a stationary nut 57 fixed to the binocular body 44. The outboard end 58 of the threaded portion 56 of the shaft 55 bears against pivotal contact 59 which is pivotally fixed to the binocular body 44 at 60 and has an outboard contact end 61 which may be driven into electrical contact with a conductive member 62. The pivotal contact 59 is spring-biased (by any convenient means not shown) in the direction of the arrow 63 to normally bear against the end 58 of the threaded portion 56 of the shaft 55. Similarly, the conductive member 62 is pivotally fixed to the body 44 of the binoculars at 64 and is spring biased (by any convenient means, not shown) to move generally upwardly as indicated by the arrow 65. Another contact 66, fixed in position with respect to the body 44 of the binocular, selectively contacts the conductive member 62 as will be described further below.

An electronics sub-system for controlling the electromechanical apparatus and providing a range readout includes logic gates 70, 71, 72, 73, 75 and 76 and electronic switches 77, 78, 79, 80 and 81. As previously indicated, the circuit also includes on/off switch 2, rocker switch 3 and switch 4 for selectively activating range readout. In the following discussion, positive logic will be assumed and the presence of small circles at a gate input leg will conventionally represent a logic inversion. It may also be assumed that open circuits represent logic "0" at an input to a gate which may be accomplished through the conventional use of pull down resistors 83, 84, 85. It will also be noted that power is always supplied to the conductive member 62 and that the gates 70, 71, 72, 73 (implemented in low power CMOS or the like) are always energized by connections which are not shown for simplicity. The current drain is sufficently low as to readily admit of this constant energization, the use of which somewhat simplifies the circuitry.

When the switch 2 is thrown to the "on" position, a logic "1" is applied to the upper input legs of gate 70, 71 and 72. Because (as will be explained more fully below) the mechanism will previously have been "parked" upon the last "off" cycle such that the contact 66 and the conductive member 62 are touching, the logic gate 70 will be momentarily fully enabled to close the electronic switches 78 and 80 and therefore apply voltage to the motor 30 in a polarity which will drive the threaded portion 56 of the shaft 55 downwardly to deflect the conductive member 62 away from the contact 66. At this instant, the logic gate 70 is disabled, and the drive to the motor from this source is terminated. This may be considered an "initialization" cycle which takes place very quickly. It may also be noted that the gate 71 is briefly fully enabled to apply a reset pulse to certain of the electronic circuitry for reasons which will be discussed below.

As soon as the circuit has been broken between the conductive member 62 and the contact 66, the gate 72 becomes fully enabled to close the electronic switch 77 and thereby activate the rocker switch 3 for normal ranging operation. The rocker switch 3, as previously described, is a spring loaded "normally center-off" type which may be thrown to two alternative "on" positions which result in applying opposite polarity voltages to the motor 30 to therefore drive the motor 30 in opposite directions and correspondingly pivot the range-mark translation plates 18 as previously described through the mechanism also previously described.

As soon as the contact end 61 of the pivotal contact 59 is driven into contact with the conductive member 62, power is delivered to the coil 86 of relay 87 to close the contacts 88 and thereby make available operating voltage +V to the remainder of the circuitry during normal operation. Those skilled in the art will appreciate that, if a sufficiently low current motor is employed, the relay 87 may be eliminated and the +V source taken directly from the pivotal contact 59.

After a period of use, the switch 2 (which may be of the push on-push off type) may be actuated again to power down the circuitry. However, it is desirable to have the mechanism always "parked" at the same position in order to avoid cumulative errors. Thus, when the switch 2 is thrown to the "off" position, the logic gate 72 is disabled to disable the electronic switch 77 and consequently the rocker switch 3. Simultaneously, the logic gate 73 is fully enabled to correspondingly enable the electronic switches 79 and 81 which serve to drive the motor in a direction in which the threaded end 56 of the shaft 55 is withdrawn in the nut 57 until the contact end 61 is pulled away from the conductive member 62, this action taking place just after the contact member 62 has engaged the contact 66. At this instant, the logic gate 73 is disabled to stop further "parking" action, and the relay 86 drops out to complete the parking cycle at a predetermined position.

As previously mentioned, counter wheel 31 is provided with a slit 29, and this arrangement can be employed to count revolutions of the counter wheel 31 by providing a light source 90 on one side of the counter wheel and a light sensor 91 on the other side. Thus, pulses may be obtained as the motor 30 rotates, and these can be employed to increment or decrement an up/down counter 92. Whether the up/down counter 92 is to count up or count down is determined by which of the logic gates 75, 76 is currently enabled, and their states are, in turn, controlled by the polarity of the voltage currently being applied to the motor 30. It will also be noted that the up/down counter 92 will have been preset to a predetermined reference count by the momentary enabling of gate 71 when switch 2 was first turned "on" to obtain a correspondence to the "parked" mechanical reference position of the mechanism driving the range-mark translation plates 18. Again, this avoids cumulative error during use.

Read-out may be obtained from the instantaneous count in the up/down counter 92 by applying the count to a look-up circuit 93 in which there is stored the predetermined relationship between any given count appearing in the up/down counter 92 and the actual range. Then, the information from the look-up circuit 93 may be displayed on a digital read-out 94 or applied to a digital-to-analog converter 95 which drives an analog read-out (such as a meter) 96. If it is desired to obtain a range read-out only upon interrogation, spring-loaded push button switch 4 may be employed to selectively apply power to the circuitry downstream from the up/down counter 92.

In summary, the motor 30 turns the counter wheel 31, and an up-down counter 92 keeps track of the count; each counter wheel rotation in one direction is positive, and each rotation in the other direction is negative. A worm-gear with a reduction ratio of fifty turns the gear 37 by which the plate-drive screw (i.e., the threaded portion 45 of shaft 36) is directly driven. Since the reduction is a factor of fifty, each revolution of the counter wheel 31 is associated with a screw turn of 7.2 degrees. For a gun screw of 1/56 inch pitch, this 7.2 degrees drives the end 47 of the range-mark translation plate holder 51 0.0003571 inches, or more precisely, 9.0714 microns. This change in angle (0.0003571 represents the tangent of the angle for the one-inch ordinate) results in a range-mark translation of 0.3884674 microns for each such 7.2 degree turn of the screw—or for each count currently totalled. This action, of course, is replicated in mirror image in the other monocular through the gear train 37, 38, 39, 40.

For the parameters of the exemplary binocular used throughout this specification, the range represented by the range-mark position in the focal plane is given by the following relation:

$$R \text{ (in yards)} = 34501.7/c$$

where c is always the current count derived from the back-and-forth turning of the counting disc. As can be readily seen, the total of 268.05556 microns range in plate drive-screw extension can be accomplished in 690 counts from the counting relations. Therefore (for example):

$$R \text{ (in yards)} = 34501.7/690 = 50$$

Other calculations are shown in Chart I, and the maximum errors are shown in Chart II.

CHART I

| Actual Range (yards) | $d_o$ microns | Counts $d_o$-0.3884674 | Range Presented 34501.7/c | Rounded to the nearest number | Error in % |
|---|---|---|---|---|---|
| 50 | 268.056 | 690 | 50.00 | 50 | 0 |
| 75 | 178.70 | 460 | 75.00 | 75 | 0 |
| 100 | 134.28 | 345 | 100.00 | 100 | 0 |
| 200 | 67.01 | 172 | 200.59 | 201 | 0.5 |
| 300 | 44.68 | 115 | 299.97 | 300 | 0 |
| 400 | 33.51 | 86 | 399.96 | 400 | 0 |
| 500 | 26.81 | 69 | 499.92 | 500 | 0 |
| 600 | 22.34 | 57 | 605.29 | 605 | 0.8 |
| 700 | 19.15 | 49 | 699.88 | 700 | 0 |
| 800 | 16.75 | 43 | 802.37 | 802 | 0.25 |
| 900 | 14.89 | 38 | 907.94 | 908 | 0.9 |
| 1000 | 13.40 | 34 | 1015.76 | 1016 | 1.6 |

CHART II - Maximum Errors Derived by Either Electronic Method of Range Determination

| Range (yards) | Maximum Error (yards) |
|---|---|
| 50 | 1 |
| 75 | 1 |
| 100 | 1 |
| 200 | 1 |
| 300 | 3 |
| 400 | 5 |
| 500 | 8 |
| 600 | 11 |
| 700 | 14 |
| 800 | 19 |
| 900 | 24 |
| 1000 | 30 |

The maximum possible error results from using a limited number of integer-counts (657) and could be reduced by using more slits 29 in the counter wheel 31 or by having a larger gear ratio between the counter wheel 31 and the screw 45. The disclosed arrangement, however, is satisfactory for the binocular application to which the present invention is directed.

Still summarizing, the method of obtaining range from the range-mark position, which is coincident with focal-plane displacements of the images of the real-world target, involves the counting of increments of tilt of the range-mark translation plates 18. For the method under consideration, the linear relation between plate tilt and the range-mark translation is unimportant (although it must be known what the relation is). It is only necessary to count the turns of the counter wheel 31, and the number of these turns is related in a predictable way to the displacement of range-mark images. This number of turns, both forward and backward, will yield a current count; that is, as the counter wheel turns in one direction, it counts from 34 to 690 (in this illustration) in a positive direction. When the wheel turns in the other direction, the count is subtracted. Therefore, the number of counts at any particular time is directly related to the angle of tilt of the range-mark translation plates.

In order to translate this position of the translation plates into a digitally indicated range, an EPROM (Electronically Programmable Read Only Memory, an addressable memory chip) or equivalent storage member is employed as the look-up circuit 93. For example, the counter 92 output (the number of current counts at any one time) can be used as the address, and the data contained at that address will have been previously stored with the correct range value to be displayed. This previously stored data will have been derived from a calculation of a constant divided by the count. The details of the derivation of this constant will be described below, but at this point, it need only be appreciated that the results of the calculations for all values of c (the count) are available by addressing different values of c itself. Since there are only 657 solutions, a very abbreviated memory will suffice. In every case, the value of c will recall from memory the corresponding solution.

The above method does not require linearity between counts and sizes of increments of range-mark-image translation. In fact, one can have the range read-out given in any unit, be they yards, meters, feet, ells, rods or furlongs. This may be accomplished by changing the values which correspond to the values of c which are stored in the memory, and can be changed or adapted at will.

The control of large cumulative errors in counting is made possible by having the counting begin anew from a known reference point every time the binocular is turned on. The counting will always start at fifty yards (or other lower limit value/unit which may have been selected). Under this circumstance, the count will call up the fifty yard solution, and the number "0050" will be displayed. As can be seen in Column 3 of Chart I, there are 657 (690 minus 33) counts in the range between 50 and 1000 yards. It does not matter where the numbers start or whether they go up or down with range. It is more convenient, however, to have the count of "1" represent 50 yards and have the count of 657 call up a range of 1016 yards. See Column 5 of Chart I.

It is, of course, difficult to stop a motor accurately to within one-fiftieth of a revolution (7.2 degrees); therefore, as previously discussed, provision is made to begin the count all over again when the binocular is turned on and when the range-marks are in the appropriate positions for a fifty yard range. When the binocular is turned off, the motor 30 is momentarily activated to turn the shaft 55 until it contacts the spring-loaded conductive member 62 and stopping the motor. When the "on" button (actually the same as the "off" button) is depressed, the count c and mechanical position of the range-mark translation plates 18 are at reference values.

Since the range varies inversely as the displacement of the range-mark and, therefore, inversely as the motor position or speed, it is desirable to move the motor 30 slower at long ranges and faster at short ranges. If this is not done, the range adjustment at long ranges will be very fast while the changes in range adjustment for short ranges will seem interminably slow. This is because small angular differences at long ranges make a great difference in range, while large angular differences at short ranges make relatively little difference in range. Therefore, a rheostat 97 (driven off the spur gear 38 via worm 98 and follower gear 99) is disposed in series with the motor 30 so that the motor will be provided relatively high voltage at short ranges and relatively low voltages at long ranges. Since the speed of the motor is proportional to voltage, the motor will run slowly at long ranges and relatively fast at short ranges. A d-c permanent magnet motor or a d-c shunt wound motor will behave accordingly.

As shown in FIGS. 2 and 5, the hinge-line 14 axis is located midway between two gears 38, 39 (teeth not shown). These gears, along with both monoculars, are folded about the hinge-line 14. As they are folded from a position of +10 degrees to −10 degrees, the teeth of the gears 38, 39 merely roll into each other, and neither gear rotates relative to the monocular to which it is closest. That is, the teeth and gears merely roll around along with the monocular and thereby do not disturb or affect each other. If, however, the gears are not in close contact when the gear centers are in line with a point on the hinge line, then when the binocular is folded either way from this central position, the gears will come into closer contact by a distance equal to the change in S (i.e., s(1−cos 10°) where s is the distance between gear centers).

If the distance between the gear centers (when they are in line with the point on the hinge-line) is 0.5 inch, then the gears 38,39 must be separated an additional amount of 0.5×0.0152 or 0.0076 inches in order to allow for folding (plus or minus 10 degrees per monocular). This excess distance between gears for the allowance of the folding of the binoculars is easily accommodated without affecting adequate engagement of gear teeth.

Light may be provided for illuminating the rangeindicating numbers, and for range-mark projection by either of two methods. Preferably, conventional (as widely used in cameras) technology such as backlit liquid crystal display and incandescent and/or light emitting diodes is employed in the system in conjunction with the electro-mechanical structure.

However, an alternative ("no battery") method involves the use of an elongate slab of red fluorescent plastic, for example, to obtain the illumination requirements with manually operated mechanisms. When the broad side of the piece of plastic is illuminated by light of wavelengths shorter than red, as from the sun, the sky, clouds, or haze, then approximately one-sixth of the resulting fluorescent light finds its way by total internal reflection into each of the six faces of the rectangular solid piece of plastic. If one small end of the rectangular piece of plastic is aluminized, then the opposite end will emit almost one-third of the fluorescent radiation derived within the plastic. Accordingly, this bright end of the plastic solid can be brighter than the ambient light which illuminates the broad side of the plastic form. From this bright end of the plastic form, light can be conducted by fiber bundles into the required locations for illumination of the back-lighted reticles. Again, any particular reticle component can be deprived of light by interrupting the plastic-fiber channel. The fluorescent plastic rectangular form would, of course, be oriented on the top of the binocular such that the broad face would be exposed optimally to natural sources of radiation.

Figure 6A:
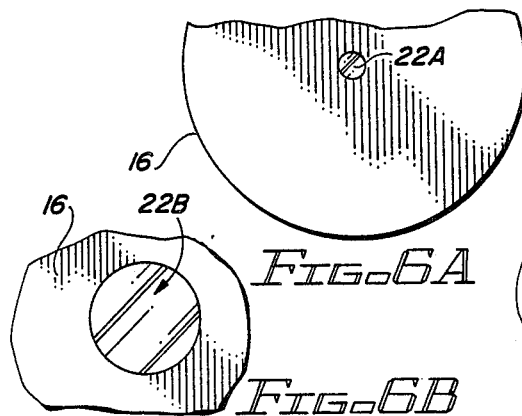
FIG. 6A, 6B, 6C and 6D illustrate the reticle for obtaining the projected images and variations in its configurations, all sharing the common characteristic of circular symmetry.
Figure 6B:
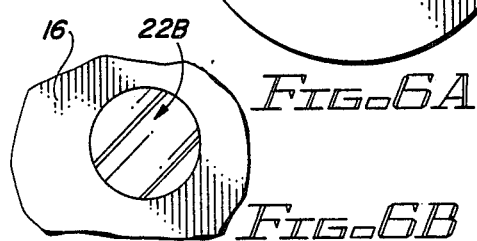
Figure 6C:
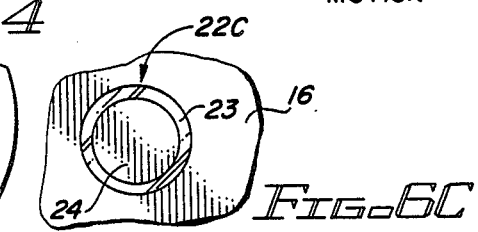

Referring now to FIGS. 6A, 6B, and 6C, each of the reticles 16 (FIGS. 2 and 5) may consist of a glass disk having a metalized opaque surface with a clear region 22A (or a patterned clear/opaque region) in the center to establish the pattern of the range-mark which, for the reasons previously discussed, should be of circular symmetry. Thus, as shown in FIG. 6B, one configuration can simply be a "moon" in which the entire central region 22B is clear such that the range-mark will appear as a "moon" in the field of view.

Figure 6D:
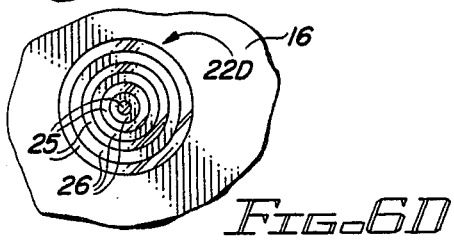

Alternatively, as shown in FIG. 6C, the region 22C may consist of a ring clear region 23 encircling an opaque central region 24 to provide a ring-like range-mark. However, the presently preferred configuration for the range-mark is illustrated in FIG. 6D in which the central region 22D consists of alternative clear 25 and opaque 26 concentric rings. This configuration is preferred because it provides a ready means for estimating the size of a target once the range-mark has been placed at the same range as the target.

It could be a source of concern that parallelism of the optic axes of binoculars could be lost by differential expansion of the aluminum hinge or other aluminum parts within the body of the binocular. In the present application, such parallelism must be maintained to a high level of confidence. Thus, this potential problem, and a simple solution, will now be discussed.

For purposes of analysis, the binocular body is considered to be constructed of cast aluminum having a thickness of 1/32nd inch (0.0794 mm). Along the hinge-line, conductive aluminum having a cross section of 1/16th square inch is assumed. Under these assumptions, it can be understood that the conductive characteristics of the binocular is at least equal to an aluminum rod of 1/16 square inch over the entire surface and especially along the hinge-line. The cast aluminum comprising the binocular body can be considered at least a two-inch wide strip of aluminum such that the cross section can again be considered to be the equivalent of a 1/16th square inch aluminum rod in all directions. If a square inch of the surface is heated, for example, the heat from this square inch is considered to be conducted along a cross sectional area having an effective length of four inches. Accordingly, the two-inch wide assumption for width, which yields the equivalent of a 1/16th square inch cross section, is a conservative approximation.

If, for example, the sun selectively illuminates some particular one-inch square of the surface of the binocular, then the thermal gradient which might result across a distance of, say, four inches can be approximated. The worst possible case can now be considered, ignoring thermal conductivity along broad areas of high cross section, but considering heat flow in limited cross-sections through the binocular (e.g., as from objectives toward eyepieces), such that the interobjective distance would expand more than the interocular distance.

The following calculations are made in order to show that a properly insulated aluminum frame will not be measurably warped by differential heating, at least under normal operating conditions.

If the two opposite faces of a rectangular solid are maintained at temperatures $t_1$ and $t_2$, the heat conducted across the solid of section a and thickness d in a time T will be:

$$Q = K(t_2 - t_1)aT/d$$

where K is a constant depending on the nature of the substance, designated as the specific heat conductivity, $t_1$ and $t_2$ are given in degrees Centigrade, a is in cm$^2$, T is in sec, and d is in cm. For a separation of four inches, for example, between objective lens centers, and considering a linear distance of four inches, the differential linear expansion at the ends of the distance or across the binocular width of four inches, cannot be allowed to exceed $3.15 \times 10^{-5}$ inches (0.8 microns). This differential expansion (for aluminum) could result from a thermal gradient (within the four-inch length, for example) of only 0.342 degrees Centigrade.

Referring briefly again to FIG. 1, it will be observed that the binocular body 102 is encased in a layer 100 of foam insulation covered with a tough outer skin 101 of vinyl or the like. (An exemplary epoxy foam insulation for this application is sold under the trademark "Lockfoam H-602") by Nopco Chemical Company. For one square inch of foam insulation ($K = 4.5 \times 10^{-5}$) with which this body of the binocular 1 is covered:

$$\begin{aligned} Q &= 4.5 \times 10^{-5}(5.0)(6.45)(1)/0.3175 \\ &= 4.57 \times 10^{-3} \text{ cal/sec.} \end{aligned}$$

For a ¼ inch square cross-section (a section 1/16 inch by 1 inch) of aluminum, for example, four inches long:

$$\begin{aligned} (t2 - t1) &= Qd/KTa \\ &= 4.57 \times 10^{-3}(10.16)/(0.50)(1)(0.4) \\ &= 0.037 \text{ degrees C.} \end{aligned}$$

In order to satisfy this temperature gradient, the heat used up in raising the temperature of the aluminum as in diffusivity is negligible. Therefore, since the required limit for temperature gradient limitation and the anticipated possible gradient are different by an approximate factor of ten (9.243), any problems resulting from misalignment due to differential thermal expansion is rendered negligible by the provision of the insulation layer 100.

It should be noted that a full square inch was taken for the area of insulation through which differential heating is allowed to penetrate. It was further assumed that all of this heat was efficiently furnished to one end, and only one end, of the four to five inch long binocular body. Accordingly, this calculation shows that if a square inch of the exterior of the insulation of ⅛th inch thickness is held at five degrees Centigrade above the rest of the exposed surface; and if all the heat transmitted is furnished to this one location, then the total thermal gradient of heat through the length of ⅛th inch by one inch section amounts to 0.037 degrees C.

Although heat capacity of materials are ignored in this calculation, this is justifiable since the heat capacity of foam insulation is negligible, and the heat capacity of aluminum is small in effect, not only because of the low specific heat and high conductivity, but also due to the long thermal time-constant associated with the insulated system. Actually, the gradient derived by the assumption of a four-inch strip of aluminum of 1/16th square inch cross-section (1/16th×1 inch) is conservative by a factor of at least four. This is because the minimum average width of a strip which truly represents a single monocular tube containing a 35 mm objective is more like 33 mm×Pi or 110 mm, more than four times the assumed one-inch (25.4 mm) width. Thus, the anticipated thermal gradient would be less than the value of 0.037 degrees C. by a factor of at least four. As a result, the expansion truly expected from differential heating is less than troublesome by a factor of more than thirty-six. This means that insulation could be reduced in thickness from 1/8th to 1/16th inch, leaving a factor of eighteen for differential heating. Therefore, a troublesome level of differential heating (90 degrees C.) would never be obtained under any circumstances imaginable.

The calculated result is intuitively understandable since the insulation is from external differential heating of a material like aluminum which reaches thermal equilibrium rapidly because of high conductivity and low specific heat. i.e., the insulation furnishes the "long" time which allows the thermal equilibrium.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

I claim:

1. In a binocular characterized by two monocular barrels coupled at a hinge-line for adjusting the binocular to the interocular distance of an individual user, and in which each monocular includes a first optical path between an objective lens and an eye lens, the improvement which adapts such binocular to range-finding operation which includes a second optical path in each monocular for generating a range-mark in the focal plane thereof, said second optical path comprising:
   A) a light source;
   B) a reticle;
   C) a range-mark adjustment plate;
   D) a mirror; and
   E) a beam splitter; and in which:
   F) said light source is disposed to back-light said reticle whose image passes through said range-mark translation plate to said mirror from which said image of said reticle is reflected to said beam splitter;
   G) said reticle is configured such that said range-mark is characterized by circular symmetry; and
   H) said beam splitter is situated in the optical path between the objective lens and the eye lens such that said image of said reticle appears in the focal plane of said monocular, at a point in the focal plane representing the direction of the hinge line, as a range-mark exhibiting circular symmetry;

said improvement further comprising:
   I) range-mark translation plate adjustment means adapted to tilt said range-mark translation plate about an axis which is perpendicular to a plane containing both the binocular hinge-line and the first optical path to selectively move the position of an image of said range-mark in the focal plane of said monocular; whereby, when the barrels of said binocular are rotated about the hinge-line, the range-marks of circular symmetry in the focal planes do not move within those focal planes relative to a scene viewed at infinity.

2. The range-finding binocular of claim 1 which further includes:
   A) an adjustment plate disposed in said second optical path between said light source and said mirror; and
   (B) adjustment plate adjustment means adapted to tilt said adjustment plate about an axis which is perpendicular to a plane including both the binocular hinge-line and the optical axis of said monocular to selectively establish the range of positions of said range-mark image in the focal plane of said monocular as said range-mark translation plate is tilted.

3. The range-finding binocular of claim 2 which further includes a reimaging lens disposed in said second optical path between said range-mark translation plate and said mirror so as to focus said image of said reticle in the focal plane of said monocular as said range-mark.

4. The range-finding binocular of claim 3 which further includes:
   A) a reversible d-c motor having an output shaft;
   B) rotary-to-linear conversion means having a rotary input and a linear output;
   C) gear reduction means coupling said motor shaft to said rotary-to-linear conversion means input such that rotation of said motor shaft results in fore and aft movement of said output of said rotary-to-linear conversion means; and p1 (D) range-mark translation plate drive means coupling said ouput of said rotary-to-linear conversion means to said range-mark adjustment plate to selectively tilt said range-mark translation plate.

5. The range-finding binocular of claim 4 which further includes:
   A) range-mark translation plate tilt sensing means for determining the instantaneous angle of tilt of said range-mark translation plate; and
   B) range determining and display means for correlating said angle of tilt of said range-mark translation plate to an apparent range of said range-mark and for providing a readout thereof.

6. The range-finding binocular of claim 5 in which:
   A) said range-mark translation plate tilt sensing means includes cumulative angle sensing means for determining the cumulative angular change from a reference angle of said motor shaft; and
   B) said range determining and display means includes means for correlating an instantaneous value of said cumulative angular change to a predetermined apparent range of said range-mark and for displaying said correlated apparent range.

7. The binocular of claim 6 which further includes means for selectively enabling and disabling said light source.

8. The binocular of claim 1 which further includes means for selectively enabling and disabling said light source.

* * * * *